United States Patent
Tomiyama et al.

(10) Patent No.: US 10,487,911 B2
(45) Date of Patent: Nov. 26, 2019

(54) TORQUE FLUCTUATION INHIBITING DEVICE, TORQUE CONVERTER AND POWER TRANSMISSION DEVICE

(71) Applicant: EXEDY Corporation, Neyagawa-shi, Osaka (JP)

(72) Inventors: Naoki Tomiyama, Neyagawa (JP); Yoshiyuki Hagihara, Neyagawa (JP); Koichi Higuchi, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 29 days.

(21) Appl. No.: 15/739,910

(22) PCT Filed: Aug. 24, 2016

(86) PCT No.: PCT/JP2016/074647
§ 371 (c)(1),
(2) Date: Dec. 26, 2017

(87) PCT Pub. No.: WO2017/043316
PCT Pub. Date: Mar. 16, 2017

(65) Prior Publication Data
US 2018/0187745 A1 Jul. 5, 2018

(30) Foreign Application Priority Data
Sep. 11, 2015 (JP) .................. 2015-179180

(51) Int. Cl.
*F16F 15/14* (2006.01)
*F16H 45/02* (2006.01)
(Continued)

(52) U.S. Cl.
CPC ...... *F16F 15/145* (2013.01); *F16F 15/13407* (2013.01); *F16F 15/31* (2013.01);
(Continued)

(58) Field of Classification Search
CPC .. F16F 15/145; F16F 15/134; F16F 15/13407; F16F 15/31; F16F 15/315;
(Continued)

(56) References Cited

U.S. PATENT DOCUMENTS 6,067,876 A * 5/2000 Lohaus ................ F16F 15/145
74/574.4
7,335,107 B2 * 2/2008 Brosowske ............... F16D 3/80
464/27
(Continued)

FOREIGN PATENT DOCUMENTS

CN 2888180 Y 4/2007
CN 103459888 A 12/2013
(Continued)

OTHER PUBLICATIONS

Office Action(Notification of Reasons for Refusal) of the corresponding Japanese Application No. 2015-179180, dated Mar. 12, 2019, 2 pp.
(Continued)

*Primary Examiner* — Thomas C Diaz
(74) *Attorney, Agent, or Firm* — United IP Counselors, LLC

(57) ABSTRACT

A device for inhibiting torque fluctuations includes a mass body disposed in alignment with a rotor in an axial direction. The mass body is rotatable with the rotor, and is also rotatable relatively to the rotor. The device includes a centrifugal element that receives a centrifugal force to be generated by rotation of the rotor and the mass body. A cam mechanism includes a cam and a cam follower. The cam mechanism converts the centrifugal force that acts on the centrifugal element into a circumferential force when a relative displacement is produced between the rotor and the mass body in a rotational direction. The circumferential force is directed to reduce the relative displacement. The
(Continued)

cam is provided on the centrifugal element or one of the rotor and the mass body, the cam follower is provided on the one of the rotor and the mass body or the centrifugal element.

18 Claims, 15 Drawing Sheets

(51) Int. Cl.
 *F16F 15/31* (2006.01)
 *F16F 15/134* (2006.01)
 *F16F 15/315* (2006.01)
(52) U.S. Cl.
 CPC .......... *F16F 15/315* (2013.01); *F16H 45/02* (2013.01); *F16H 2045/0263* (2013.01)
(58) Field of Classification Search
 CPC .......... F16F 2230/0064; F16F 15/1457; F16F 15/1428; F16H 45/02; F16H 2045/0263
 See application file for complete search history.

(56) References Cited

U.S. PATENT DOCUMENTS

| | | | | |
|---|---|---|---|---|
| 8,156,842 | B2 * | 4/2012 | Movlazada | F16F 15/12306 74/574.4 |
| 8,469,826 | B2 * | 6/2013 | Brosowske | F16D 31/06 29/888 |
| 8,834,027 | B2 * | 9/2014 | Zeidan | F16F 15/1215 384/99 |
| 9,683,629 | B2 * | 6/2017 | Krause | F16F 15/145 |
| 9,803,718 | B2 * | 10/2017 | Miyahara | F16F 15/145 |
| 10,184,542 | B2 * | 1/2019 | Tomiyama | F16F 15/31 |
| 2014/0026712 | A1 | 1/2014 | Movlazada | |
| 2014/0090514 | A1 | 4/2014 | Toegel et al. | |
| 2016/0160959 | A1 | 6/2016 | Takikawa et al. | |

FOREIGN PATENT DOCUMENTS

| | | |
|---|---|---|
| CN | 103582767 A | 2/2014 |
| CN | 104455199 A | 3/2015 |
| CN | 104685259 A | 6/2015 |
| DE | 102012204186 A1 | 10/2012 |
| DE | 102011076790 A1 | 12/2012 |
| DE | 102013220287 A1 | 4/2015 |
| DE | 102014116855 A1 | 6/2015 |
| JP | 01-312246 A | 12/1989 |
| JP | 2010249296 A | 11/2010 |
| JP | 2011099490 A | 5/2011 |
| JP | 2014516142 A | 7/2014 |
| JP | 2014145413 A | 8/2014 |
| JP | 2015057565 A | 3/2015 |
| JP | 2015094424 A | 5/2015 |
| WO | 2012130203 A1 | 10/2012 |
| WO | 2012163621 A1 | 12/2012 |
| WO | 2015020086 A1 | 2/2015 |

OTHER PUBLICATIONS

International Search Report dated Nov. 1, 2016 for corresponding foreign Application No. PCT/JP2016/074647, 2 pp.
First Office Action of the corresponding Chinese Application No. 201680045500.4, dated Mar. 8, 2019, 5 pp.
Second Office Action of the corresponding Chinese Application No. 201680045500.4, dated Aug. 2, 2019, 7 pp.

* cited by examiner

TORQUE FLUCTUATION INHIBITING DEVICE, TORQUE CONVERTER AND POWER TRANSMISSION DEVICE

CROSS-REFERENCES TO RELATED APPLICATIONS

This application is the U.S. National Phase of PCT International Application No. PCT/JP2016/074647, filed on Aug. 24, 2016. That application claims priority to Japanese Patent Application No. 2015-179180, filed on Sep. 11, 2015. The contents of both applications are herein incorporated by reference in their entirety.

BACKGROUND

Technical Field

The present disclosure relates to a torque fluctuation inhibiting device, particularly to a torque fluctuation inhibiting device for inhibiting torque fluctuations in a rotor to which a torque is inputted. Additionally, the present disclosure relates to a torque converter and a power transmission device, each of which includes the torque fluctuation inhibiting device.

Background Art

For example, a clutch device, including a damper device, and a torque converter are provided between an engine and a transmission in an automobile. Additionally, for reduction in fuel consumption, the torque converter is provided with a lock-up device for mechanically transmitting a torque at a predetermined rotational speed or greater.

The lock-up device generally includes a clutch part and a damper including a plurality of torsion springs. Additionally, the clutch part includes a piston to which a friction member is attached and that is pressed onto a front cover by an action of hydraulic pressure. Then in a lock-up on state, a torque is transmitted from the front cover to the piston through the friction member, and is further transmitted therefrom to an output-side member through the plural torsion springs.

In the lock-up device described above, torque fluctuations (fluctuations in rotational velocity) are inhibited by the damper including the plural torsion springs.

Incidentally, a lock-up device described in Japan Laid-open Patent Application Publication No. 2015-094424 is provided with a dynamic damper device including an inertia member in order to inhibit torque fluctuations. The dynamic damper device described in Japan Laid-open Patent Application Publication No. 2015-094424 is attached to a plate supporting torsion springs, and includes a pair of inertia rings, which is rotatable relatively to the plate, and a plurality of coil springs disposed between the plate and the inertia rings.

BRIEF SUMMARY

A peak of torque fluctuations, occurring in a predetermined rotational speed range, can be reduced in lock-up devices by installing therein the dynamic damper device described in Japan Laid-open Patent Application Publication No. 2015-094424.

Well-known dynamic damper devices including that of Japan Laid-open Patent Application Publication No. 2015-094424 can reduce a peak of torque fluctuations in a predetermined rotational speed range. However, when the specification of the engine or so forth is changed, a rotational speed range in which a peak of torque fluctuations appears varies in accordance therewith. Therefore, the inertia amount of the inertia rings and the spring constant of the coil springs are required to be changed in accordance with changing the specification of the engine or so forth. However, coping with such requirement may be difficult in some cases.

It is an object of the present disclosure to make it possible, in a device for inhibiting torque fluctuations in a rotary member, to reduce a peak of torque fluctuations in a relatively wide rotational speed range.

Solution to Problems (1) A torque fluctuation inhibiting device according to the present disclosure is a device for inhibiting torque fluctuations in a rotor to which a torque is inputted. The torque fluctuation inhibiting device includes a mass body, a centrifugal element and a cam mechanism. The mass body is disposed in alignment with the rotor in an axial direction, and is disposed to be rotatable with the rotor and be rotatable relatively to the rotor. The centrifugal element is disposed to receive a centrifugal force to be generated by rotation of the rotor and the mass body. The cam mechanism includes a cam and a cam follower. When a relative displacement is produced between the rotor and the mass body in a rotational direction, the cam mechanism converts the centrifugal force acting on the centrifugal element into a circumferential force directed to reduce the relative displacement. The cam is provided on the centrifugal element or one of the rotor and the mass body. The cam follower is provided on the one of the rotor and the mass body or the centrifugal element.

When a torque is inputted to the rotor in this device, the rotor and the mass body are rotated. When the torque inputted to the rotor does not fluctuate, relative displacement is not produced between the rotor and the mass body in the rotational direction. Therefore, the rotor and the mass body are rotated in synchronization with each other. On the other hand, when the torque inputted to the rotor fluctuates, the relative displacement is produced between the mass body and the rotor in the rotational direction (the displacement will be hereinafter expressed as "rotational phase difference" on an as-needed basis) depending on the extent of torque fluctuations, because the mass body is disposed to be rotatable relatively to the rotor.

When the rotor and the mass body are herein rotated, the centrifugal element receives a centrifugal force. Then, when the relative displacement is produced between the rotor and the mass body, the cam mechanism is actuated to convert the centrifugal force acting on the centrifugal element into a circumferential force so as to reduce the relative displacement between the rotor and the mass body by the circumferential force. Torque fluctuations are inhibited by the herein described actuation of the cam mechanism.

Here, the centrifugal force acting on the centrifugal element is utilized as a force for inhibiting torque fluctuations. Hence, characteristics of inhibiting torque fluctuations are configured to vary in accordance with the rotational speed of the rotor. Moreover, the characteristics of inhibiting torque fluctuations can be appropriately set in accordance with, for instance, the shape of the cam. Hence, a peak of torque fluctuations can be reduced in as wide a rotational speed range as possible.

(2) Preferably, the mass body includes a first inertia ring and a second inertia ring that are disposed in opposition to each other while the rotor is interposed therebetween.

Here, the inertia rings are disposed on both sides of the rotor in the axial direction. Hence, the inertia amount can be increased while increase in radial dimension of the device can be inhibited. This is effective for inhibiting torque fluctuations.

(3) Preferably, the mass body further includes a pin. The pin couples the first and second inertia rings while penetrating the rotor in the axial direction so as to make the first and second inertia rings non-rotatable relatively to each other. Additionally, the centrifugal element is preferably disposed on an outer peripheral part of the rotor and on an inner peripheral side of the pin, while being disposed between the first inertia ring and the second inertia ring in the axial direction. Moreover, the cam follower is a cylindrical roller that includes a hole, penetrated by the pin in the axial direction, in an inner part thereof. Furthermore, the cam is provided on the centrifugal element, makes contact with the cam follower, and has a shape making the circumferential force vary in accordance with an amount of the relative displacement between the rotor and the mass body in the rotational direction.

Here, the cam follower is attached by utilizing the pin coupling the first and second inertia rings. Therefore, the configuration of the cam mechanism is made simple.

(4) Preferably, the mass body further includes a coupling part coupling an outer peripheral end of the first inertia ring and an outer peripheral end of the second inertia ring, and the first and second inertia rings have an equal inner diameter. Additionally, the centrifugal element is preferably disposed on the outer peripheral part of the rotor, while being disposed between the first inertia ring and the second inertia ring in the axial direction. Moreover, the cam follower is provided on the centrifugal element. Furthermore, the cam is provided on inner peripheral end surfaces of the first and second inertia rings, enables the cam follower to make contact therewith, and has a shape making the circumferential force vary in accordance with the amount of the relative displacement between the rotor and the mass body in the rotational direction.

Here, the first and second inertia rings are coupled at the outer peripheral ends thereof. Hence, any pin is not required to couple the two inertia rings. Additionally, the inner peripheral end surfaces of the two inertia rings are configured as the cam. Hence, the configuration of the cam mechanism is made simple.

(5) Preferably, the rotor includes a recess on an outer peripheral surface thereof, and the centrifugal element is accommodated in the recess. In this case, the centrifugal element is accommodated in the recess of the rotor, and hence, increase in axial dimension of the device can be inhibited.

(6) Preferably, the centrifugal element is movable inside the recess in a radial direction, and a friction coefficient between the centrifugal element and the recess is less than or equal to 0.1.

(7) Preferably, a friction reducing member is disposed between a lateral surface of the centrifugal element, which is disposed along the moving direction of the centrifugal element, and the recess so as to reduce friction occurring in movement of the centrifugal element.

(8) Preferably, the friction reducing member is made in form of a plurality of rollers. The plurality of rollers are rotatably supported by both circumferential ends of the centrifugal element, and roll between both circumferential end surfaces of the centrifugal element and lateral surfaces of the recess.

(9) Preferably, the torque fluctuation inhibiting device further includes an urging member. The urging member is disposed inside the recess, and urges the centrifugal element outward in the radial direction such that the cam and the cam follower make contact with each other while the rotor and the mass body are not being rotated.

Here, the centrifugal element is urged radially outward by the urging member, whereby the cam and the cam follower are caused to constantly make contact with each other. Therefore, it is possible to eliminate sound to be produced when the cam follower is separated from the cam in stop of rotation or when the cam follower makes contact (collides) with the cam in start of rotation.

(10) Preferably, the mass body has a continuous annular shape.

(11) A torque converter according to the present disclosure is disposed between an engine and a transmission. The torque converter includes an input-side rotor to which a torque is inputted from the engine, an output-side rotor outputting the torque to the transmission, a damper disposed between the input-side rotor and the output-side rotor, and the torque fluctuation inhibiting device configured as any of the above.

(12) Preferably, the torque fluctuation inhibiting device is disposed on the input-side rotor.

(13) Preferably, the torque fluctuation inhibiting device is disposed on the output-side rotor.

(14) Preferably, the damper includes a first damper to which the torque is inputted from the input-side rotor, a second damper outputting the torque to the output-side rotor, and an intermediate member provided between the first damper and the second damper. Additionally, the torque fluctuation inhibiting device is disposed on the intermediate member.

(15) Preferably, the damper includes a plurality of coil springs. Preferably, the torque converter further includes a float member that is rotatable relatively to the input-side rotor and the output-side rotor and supports the plurality of coil springs, and the torque fluctuation inhibiting device is disposed on the float member.

(16) A power transmission device according to the present disclosure includes a flywheel, a clutch device and the torque fluctuation inhibiting device configured as any of the above. The flywheel includes a first inertia body rotated about a rotational axis, a second inertia body, which is rotated about the rotational axis and is rotatable relatively to the first inertia body, and a damper disposed between the first inertia body and the second inertia body. The clutch device is provided on the second inertia body of the flywheel.

(17) Preferably, the torque fluctuation inhibiting device is disposed on the second inertia body.

(18) Preferably, the torque fluctuation inhibiting device is disposed on the first inertia body.

(19) Preferably, the damper includes a first damper to which a torque is inputted from the first inertia body, a second damper outputting the torque to the second inertia body, and an intermediate member provided between the first damper and the second damper. Additionally, the torque fluctuation inhibiting device is disposed on the intermediate member.

According to the present advancement described above, in a device for inhibiting torque fluctuations in a rotary member, a peak of torque fluctuations can be reduced in a relatively wide rotational speed range.

DETAILED DESCRIPTION OF EMBODIMENTS

Figure 1:
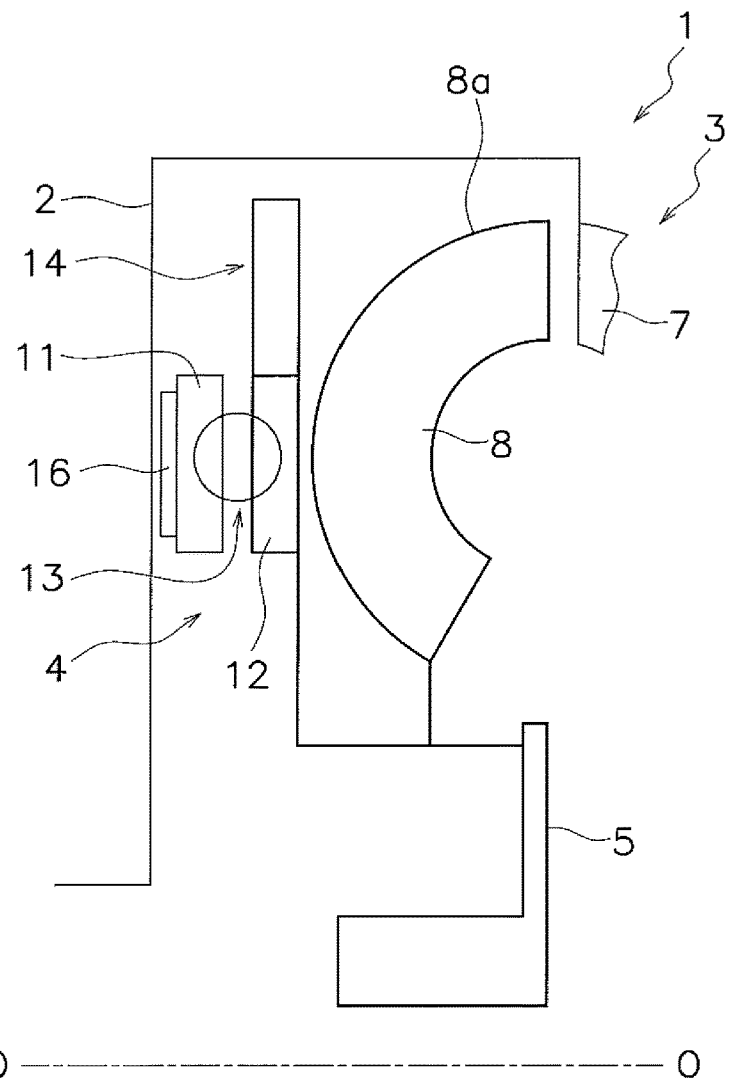
FIG. 1 is a schematic diagram of a torque converter according to an exemplary embodiment of the present disclosure.

FIG. 1 is a schematic diagram of a condition that a torque fluctuation inhibiting device according to an exemplary embodiment of the present disclosure is attached to a lock-up device for a torque converter. In FIG. 1, line 0-0 indicates a rotational axis of the torque converter.

[Entire Configuration]

A torque converter 1 includes a front cover 2, a torque converter body 3, a lock-up device 4 and an output hub 5. A torque is inputted to the front cover 2 from an engine. The torque converter body 3 includes an impeller 7 coupled to the front cover 2, a turbine 8 and a stator (not shown in the drawings). The turbine 8 is coupled to the output hub 5, and an input shaft of a transmission (not shown in the drawings) is capable of being spline-coupled to the inner peripheral part of the output hub 5.

[Lock-Up Device 4]

The lock-up device 4 includes a clutch part, a piston to be actuated by hydraulic pressure and so forth, and is settable to a lock-up on state and a lock-up off state. In the lock-up on state, the torque inputted to the front cover 2 is transmitted to the output hub 5 through the lock-up device 4 without through the torque converter body 3. On the other hand, in the lock-up off state, the torque inputted to the front cover 2 is transmitted to the output hub 5 through the torque converter body 3.

The lock-up device 4 includes an input-side rotor 11, an output-side rotor 12, a damper 13 and a torque fluctuation inhibiting device 14.

The input-side rotor 11 includes an axially movable piston, and is provided with a friction member 16 on the front cover 2-side lateral surface thereof. When the friction member 16 is pressed onto the front cover 2, the torque is transmitted from the front cover 2 to the input-side rotor 11.

The output-side rotor 12 is disposed in axially opposition to the input-side rotor 11 and is rotatable relatively to the input-side rotor 11. The output-side rotor 12 is coupled to the output hub 5.

The damper 13 is disposed between the input-side rotor 11 and the output-side rotor 12. The damper 13 includes a plurality of torsion springs and rotation-directionally couples the input-side rotor 11 and the output-side rotor 12 in an elastic manner. The damper 13 transmits the torque from the input-side rotor 11 to the output-side rotor 12, and besides, absorbs and attenuates torque fluctuations.

[Torque Fluctuation Inhibiting Device 14]

First Exemplary Embodiment

Figure 2A:
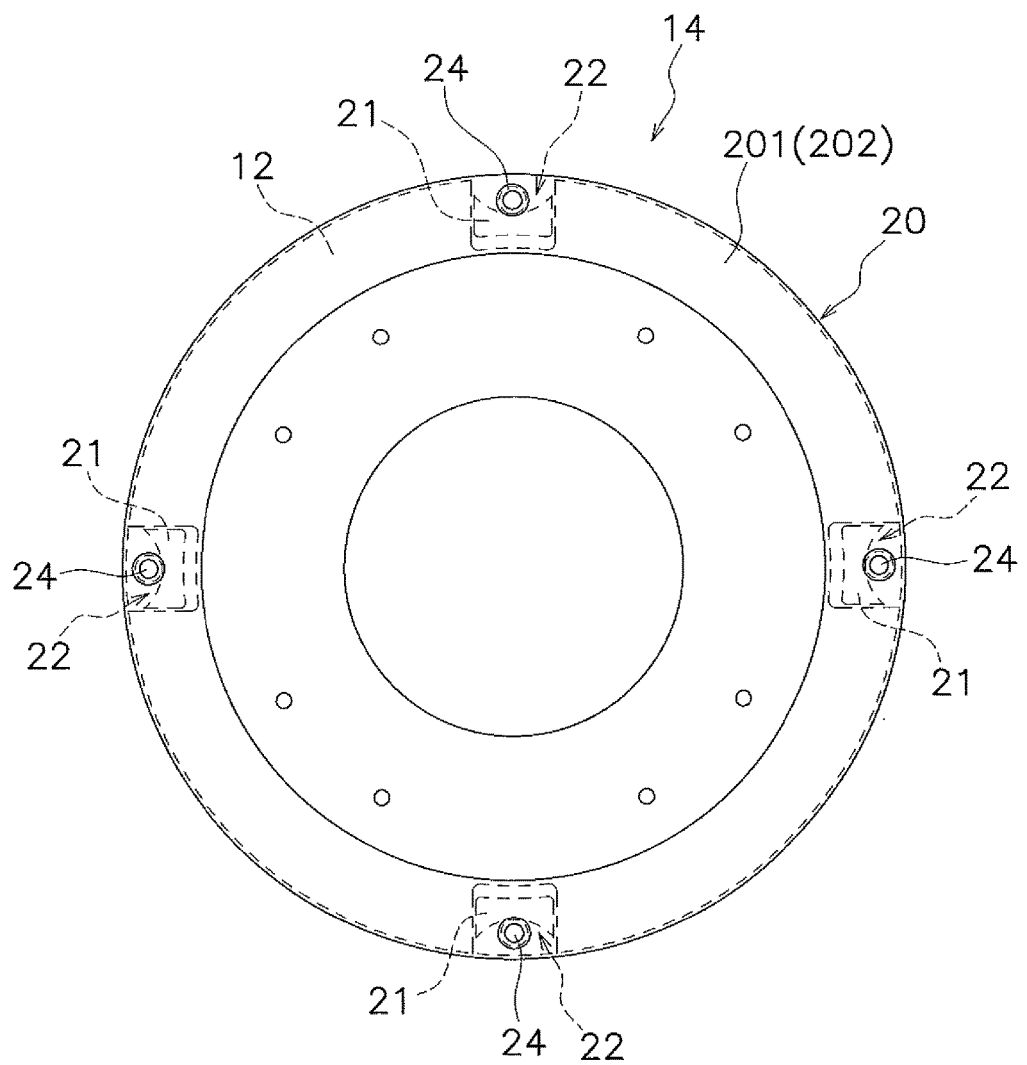
FIG. 2A is a front view of an output-side rotor and a torque fluctuation inhibiting device that are shown in FIG. 1.
Figure 3:
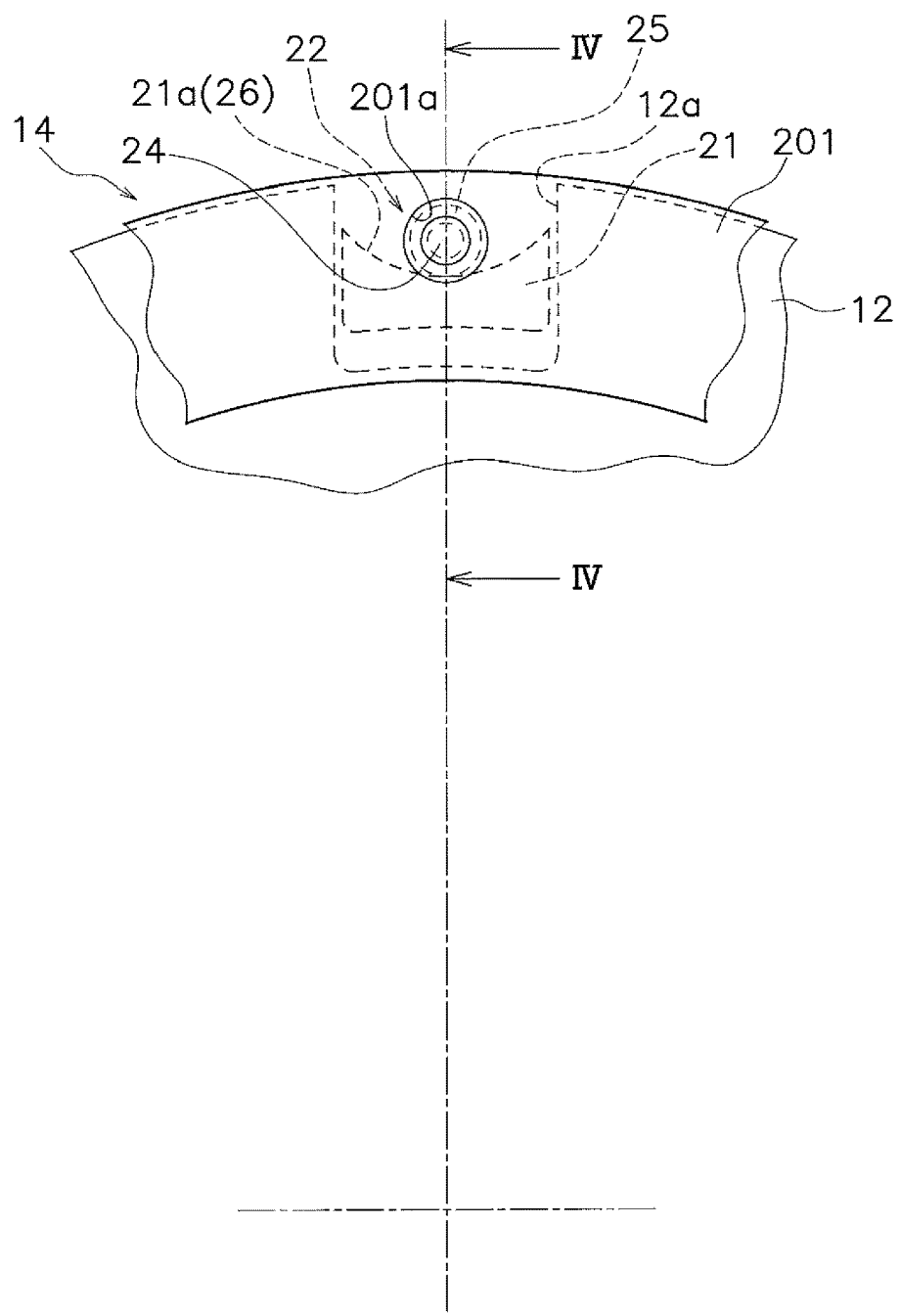
FIG. 3 is a partial enlarged view of FIG. 2A.
Figure 4:
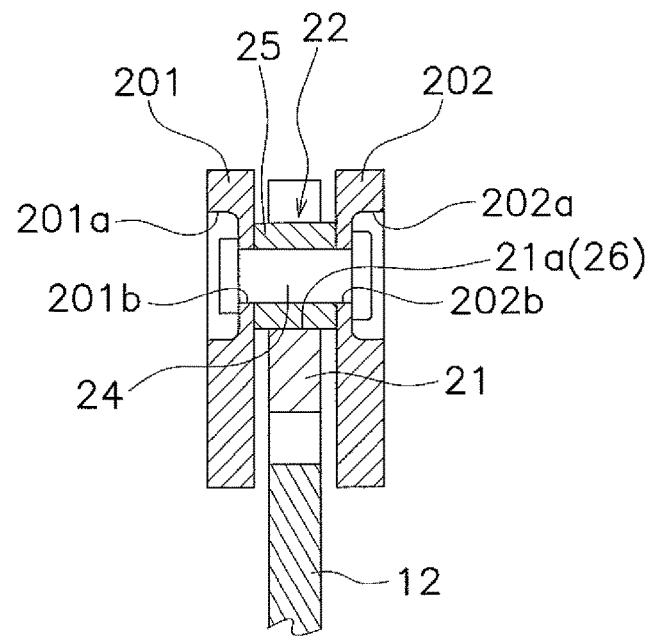
FIG. 4 is a cross-sectional view of FIG. 3 taken along line IV-IV.

FIG. 2A is a front view of the output-side rotor 12 and the torque fluctuation inhibiting device 14. Additionally, FIG. 3 shows a partial enlarged view of FIG. 2A, and FIG. 4 shows a cross-sectional view of FIG. 3 taken along line IV-IV. As shown in these drawings, the torque fluctuation inhibiting device 14 includes first and second inertia rings 201 and 202, four centrifugal elements 21 and four cam mechanisms 22. Both of the four centrifugal elements 21 and the four cam mechanisms 22 are circumferentially disposed at equal angular intervals of 90 degrees.

Figure 2B:
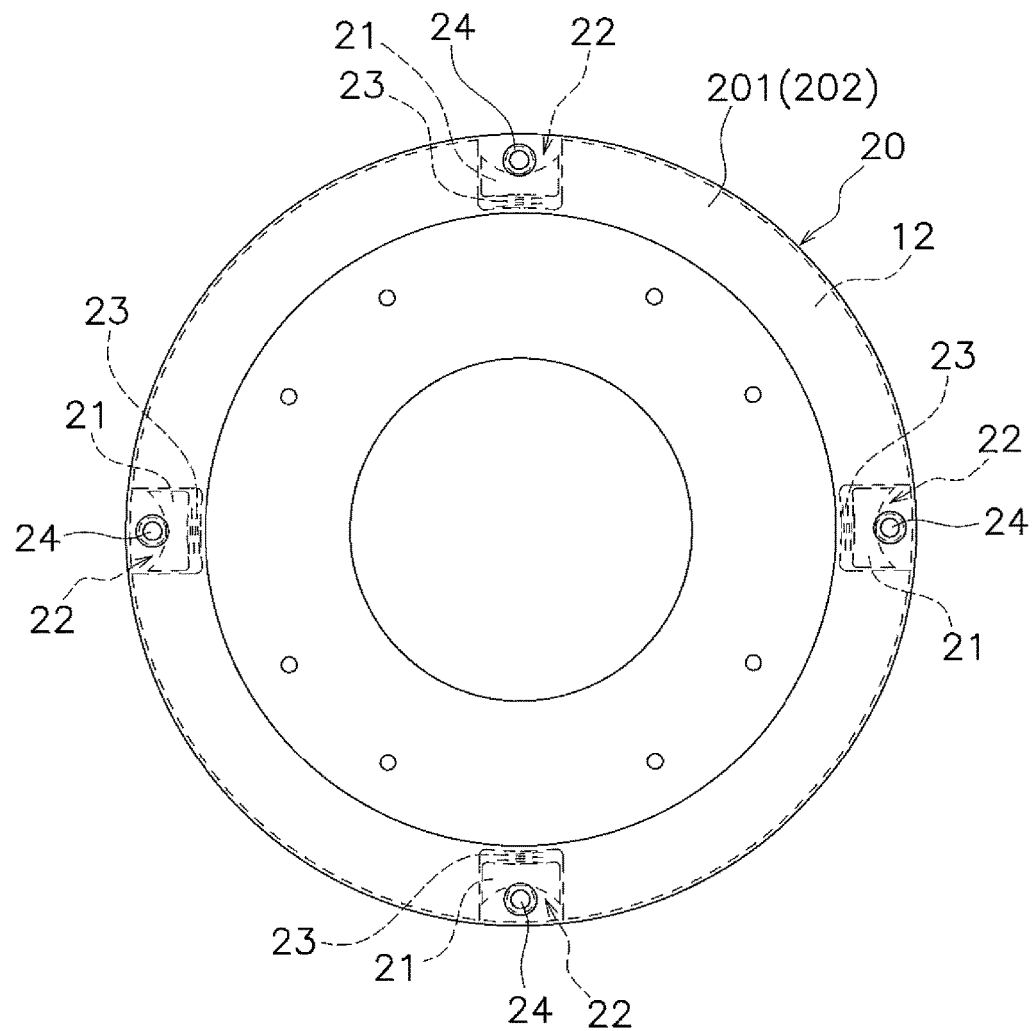
FIG. 2B is a diagram according to another exemplary embodiment and corresponds to FIG. 2A.

It should be noted that as shown in FIG. 2B, coil springs 23 can be disposed on the inner peripheral side of the centrifugal elements 21, respectively. The coil springs 23 are provided for urging the centrifugal elements 21 to the outer peripheral side. The coil springs 23 can be provided similarly to the above or may not be provided in respective examples to be hereinafter explained.

Each of the first and second inertia rings 201 and 202 is a continuous annular plate with a predetermined thickness. As shown in FIG. 4, the first and second inertia rings 201 and 202 are disposed axially on both sides of the output-side rotor 12 such that a predetermined gap is produced between the output-side rotor 12 and each inertia ring 201, 202. In other words, the output-side rotor 12 and the first and second inertia rings 201 and 202 are disposed in axial alignment. The outer diameter of each of the first and second inertia rings 201 and 202 is set to be approximately the same as that of the output-side rotor 12. Additionally, the first and second inertia rings 201 and 202 have a common rotational axis, which is the same as the rotational axis of the output-side rotor 12. The first and second inertia rings 201 and 202 are rotatable with the output-side rotor 12, and are also rotatable relatively thereto.

Each of the first and second inertia rings 201 and 202 includes recesses 201a, 202a having a predetermined axial depth on one of the lateral surfaces thereof, and further includes holes 201b, 202b, each of which axially penetrates the center of each recess 201a, 202a. Additionally, the first and second inertia rings 201 and 202 are fixed by rivets 24 that penetrate the holes 201b and 202b thereof and the output-side rotor 12. Therefore, the first inertia ring 201 is axially, radially and rotation-directionally immovable with respect to the second inertia ring 202.

The centrifugal elements 21 are disposed in the output-side rotor 12, and are radially movable by centrifugal forces to be generated by rotation of the output-side rotor 12. In more detail, as shown in FIG. 3, the output-side rotor 12 includes recesses 12a on the outer peripheral surface thereof. Each recess 12a is recessed in a rectangular shape from the outer peripheral surface of the output-side rotor 12 toward a rotational center located on the inner peripheral side. Additionally, the centrifugal elements are inserted into the recesses 12a, respectively, and are radially movable therein. The centrifugal elements 21 and the recesses 12a are constructed such that a friction coefficient between the lateral surfaces of each centrifugal element 21 and each recess 12a is set to be less than or equal to 0.1. Moreover, each centrifugal element 21 is a plate having approximately the same thickness as the output-side rotor 12, and includes an outer peripheral surface 21a recessed in a circular-arc shape to the inner peripheral side. As described below, the outer peripheral surface 21a of each centrifugal element 21 functions as a cam 26.

As shown in FIGS. 3 and 4, each cam mechanism 22 is composed of a cylindrical roller 25 functioning as a cam follower and the cam 26 corresponding to the outer peripheral surface 21a of each centrifugal element 21. Each roller 25 is fitted onto the outer periphery of the trunk of each rivet 24. In other words, each roller 25 is supported by each rivet 24. It should be noted that each roller 25 is preferably attached to each rivet 24 in a rotatable state, but alternatively, can be attached to each rivet 24 in a non-rotatable state. Each cam 26 is a circular-arc surface witch which each roller 25 makes contact. Each roller 25 is moved along each cam 26 when the output-side rotor 12 and the first and second inertia rings 201 and 202 are rotated relatively to each other in a predetermined angular range.

Although described below in detail, when rotational phase difference between the output-side rotor 12 and the first and second inertia rings 201 and 202 is produced by the contact between the rollers 25 and the cams 26, a centrifugal force generated in each centrifugal element 21 is converted into a circumferential force by which the rotational phase difference is reduced.

It should be noted that when the coil springs 23 are provided, each coil spring 23 is designed to be disposed between the bottom surface of each recess 12a and the inner peripheral side surface of each centrifugal element 21 so as to urge each centrifugal element 21 to the outer peripheral side. In the configuration that the coil springs 23 are provided, each cam 26 corresponding to the outer peripheral surface 21a of each centrifugal element 21 is pressed onto each roller 25 functioning as a cam follower by the urging force of each coil spring 23. Therefore, each cam 26 and each cam follower (each roller 25) make contact with each other even when a centrifugal force is not acting on each centrifugal element 21 in a condition that the output-side rotor 12 is not being rotated.

[Actuation of Cam Mechanisms 22]

Actuation of each cam mechanism 22 (inhibition of torque fluctuations) will be explained with FIGS. 3 and 5. It should be noted that in the following explanation, the first and second inertia rings 201 and 202 will be simply referred to as "inertia rings 201 and 202" on an as-needed basis.

In the lock-up on state, the torque transmitted to the front cover 2 is transmitted to the output-side rotor 12 through the input-side rotor 11 and the damper 13.

When torque fluctuations do not occur in transmitting a torque, the output-side rotor 12 and the inertia rings 201 and 202 are rotated as shown in the condition of FIG. 3. In this condition, the roller 25 in each cam mechanism 22 is contacted to the most inner peripheral position (the circumferential middle position) of the cam 26, and rotational phase difference between the output-side rotor 12 and the inertia rings 201 and 202 is "0".

As described above, the rotation-directional relative displacement between the output-side rotor 12 and the inertia rings 201 and 202 is referred to as "rotational phase difference". In FIGS. 3 and 5, this indicates displacement between the circumferential middle position of each centrifugal element 21 (i.e., each cam 26) and the center position (the circumferential middle position) of each cam follower 25.

Figure 5:
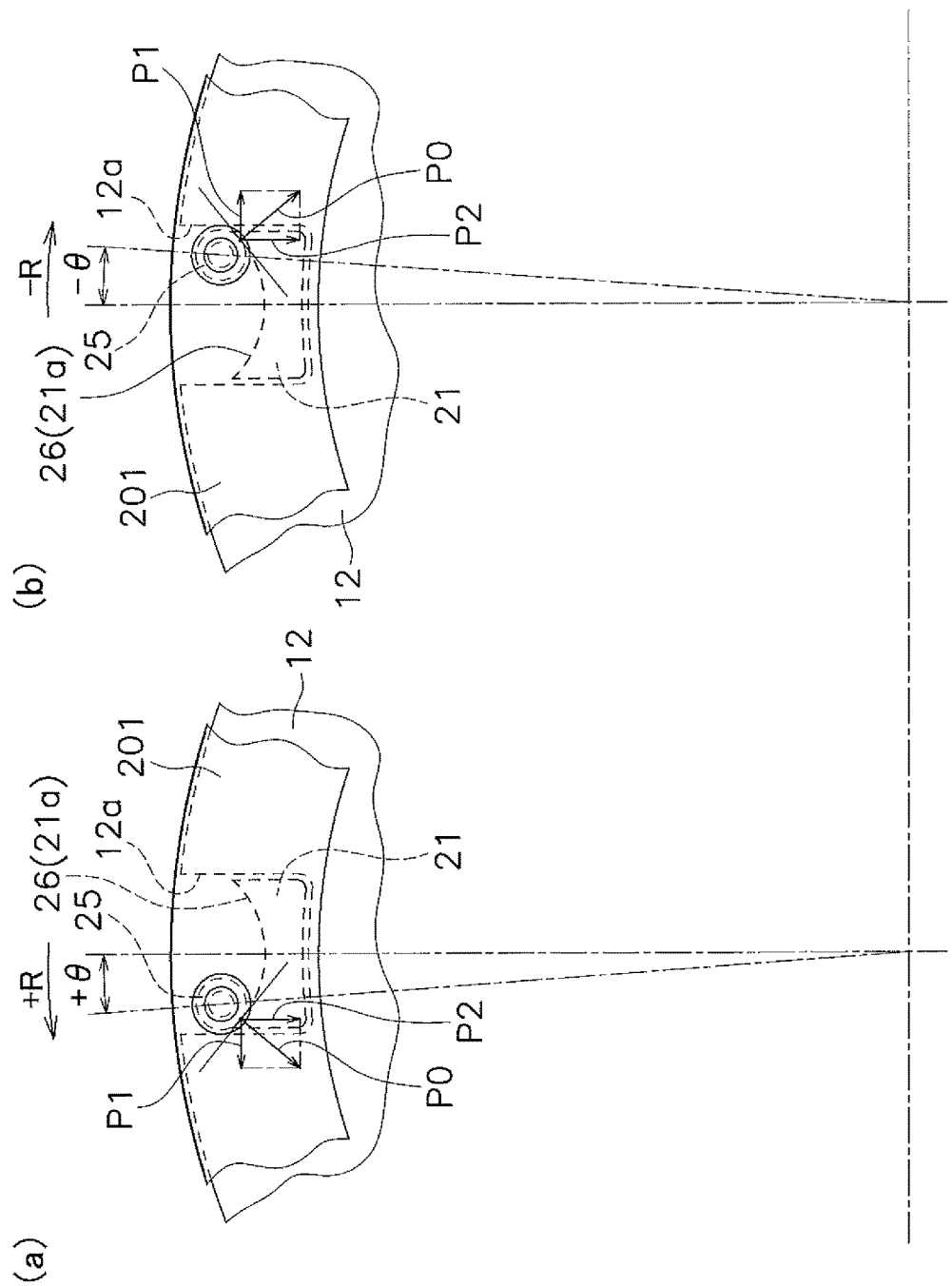
FIG. 5 is a diagram for explaining the actuation of a cam mechanism.

When torque fluctuations herein exists in transmitting a torque, rotational phase difference ±θ is produced between the output-side rotor 12 and the inertia rings 201 and 202 as shown in diagrams (a) and (b) of FIG. 5. FIG. 5(a) shows a condition that rotational phase difference +θ is produced to a +R side, whereas FIG. 5(b) shows a condition that rotational phase difference −θ is produced to a −R side.

As shown in FIG. 5(a), when the rotational phase difference +θ is produced between the output-side rotor 12 and the inertia rings 201 and 202, the roller 25 of each cam mechanism 22 is relatively moved along the cam 26 to the left side of FIG. 5(a). At this time, a centrifugal force acts on the centrifugal element 21. Hence, a reaction force to be received by the cam 26 provided on the centrifugal element 21 from the roller 25 has a direction and a magnitude indicated by P0 in FIG. 5(a). A first force component P1 and a second force component P2 are produced by the reaction force P0. The first force component P1 is directed in the circumferential direction, whereas the second force component P2 is directed to move the centrifugal element 21 toward the rotational center.

Additionally, the first force component P1 acts as a force to move the output-side rotor 12 to the leftward in FIG. 5(a) through each cam mechanism 22 and the centrifugal element 21. In other words, a force directed to reduce the rotational phase difference between the output-side rotor 12 and the inertia rings 201 and 202 is supposed to act on the output-side rotor 12. On the other hand, the second force component P2 moves the centrifugal element 21 to the radially inner peripheral side against the centrifugal force.

FIG. 5(b) shows a condition that the rotational phase difference −θ is produced between the output-side rotor 12 and the inertia rings 201 and 202. FIG. 5(b) is similar to FIG. 5(a) regarding the actuation of each cam mechanism 22, although FIG. 5(b) is different from FIG. 5(a) only regarding the moving direction of the roller 25 of each cam mechanism 22 and the directions of the reaction force P0, the first force component P1 and the second force component P2.

As described above, when rotational phase difference is produced between the output-side rotor 12 and the inertia rings 201 and 202 by torque fluctuations, the output-side rotor 12 receives a force (first force component P1) directed to reduce the rotational phase difference between the output-side rotor 12 and the inertia rings 201 and 202 by the centrifugal force acting on each centrifugal element 21 and the working of each cam mechanism 22. Torque fluctuations are inhibited by this force.

The aforementioned force to inhibit torque fluctuations varies in accordance with the centrifugal force, in other words, the rotational speed of the output-side rotor 12, and also varies in accordance with the rotational phase difference and the shape of each cam 26. Therefore, by suitably setting the shape of each cam 26, characteristics of the torque fluctuation inhibiting device 14 can be made optimal in accordance with the specification of the engine and so forth.

For example, each cam 26 can be made in a shape that makes the first force component P1 linearly vary in accordance with the rotational phase difference in a condition where the centrifugal force acting is constant. Alternatively, each cam 26 can be made in a shape that makes the first force component P1 non-linearly vary in accordance with the rotational phase difference.

[Exemplary Characteristics]

Figure 6:
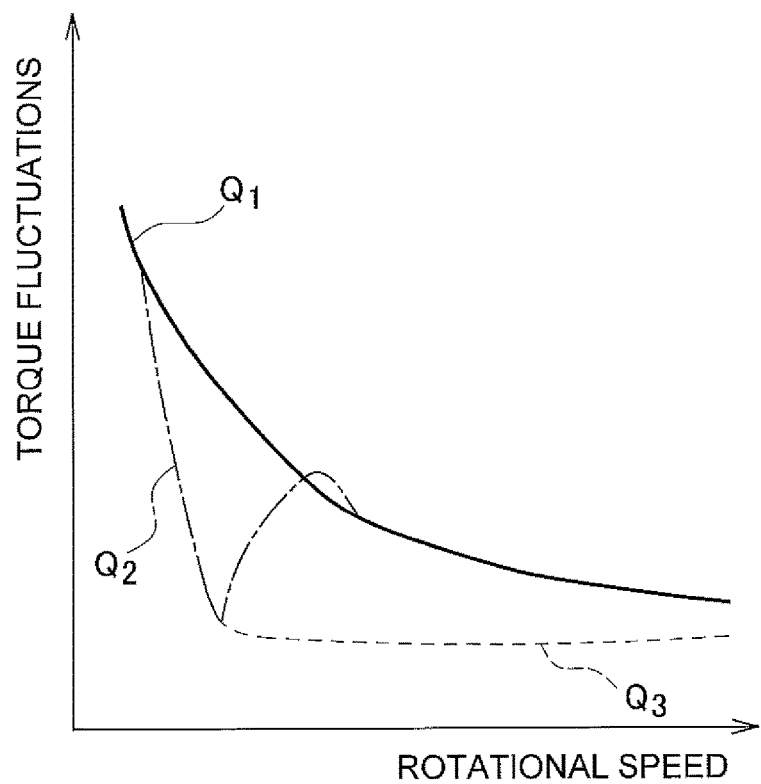
FIG. 6 is a characteristic diagram showing a relation between rotational speed and torque fluctuations.

FIG. 6 is a diagram showing exemplary torque fluctuation inhibiting characteristics. The horizontal axis indicates rotational speed, whereas the vertical axis indicates torque fluctuations (rotation velocity fluctuations). Characteristic Q1 indicates a condition without installation of a device for inhibiting torque fluctuations; characteristic Q2 indicates a condition with installation of a well-known dynamic damper device; and characteristic Q3 indicates a condition with installation of the torque fluctuation inhibiting device 14 of the present exemplary embodiment.

As is obvious from FIG. 6, in an apparatus in which the well-known dynamic damper device is installed (characteristic Q2), torque fluctuations can be inhibited only in a specific rotational speed range. By contrast, in the present exemplary embodiment (characteristic Q3), torque fluctuations can be inhibited through the entire rotational speed ranges.

Second Exemplary Embodiment

Figure 7:
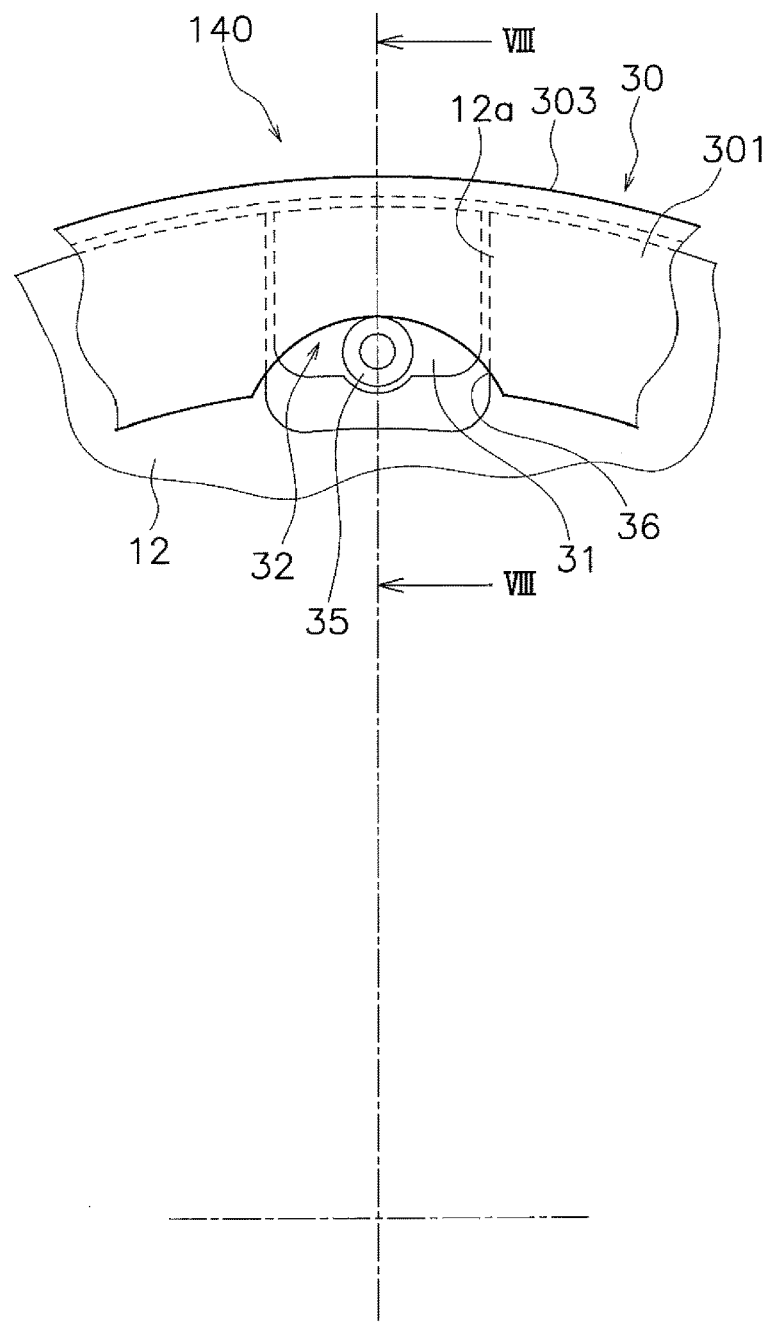
FIG. 7 is a diagram according to a second exemplary embodiment of the present disclosure and corresponds to FIG. 3.
Figure 8:
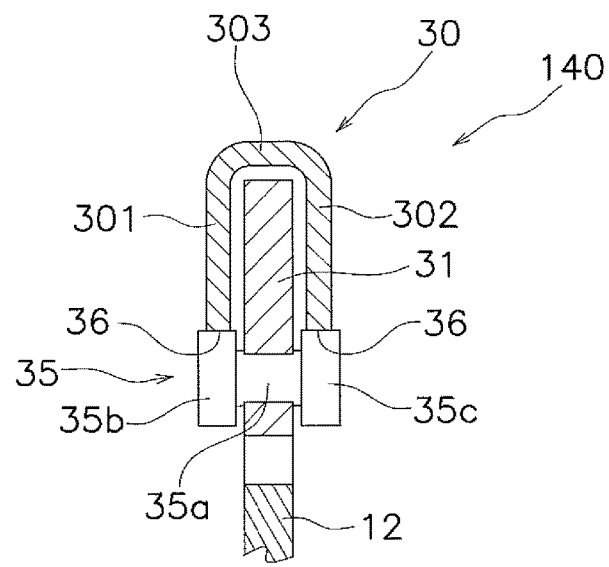
FIG. 8 is a cross-sectional view of FIG. 7 taken along line VIII-VIII.

FIG. 7 shows part of a torque fluctuation inhibiting device according to a second exemplary embodiment of the present disclosure, and corresponds to FIG. 3 in the first exemplary embodiment. Additionally, FIG. 8 is a cross-sectional view of FIG. 7 taken along line VIII-VIII.

A torque fluctuation inhibiting device 140 according to the second exemplary embodiment includes an inertia ring 30, four centrifugal elements 31 and four cam mechanisms 32. Both of the four centrifugal elements 31 and the four cam mechanisms 32 are circumferentially disposed at equal angular intervals of 90 degrees. It should be noted that coil springs are not provided in the example shown in FIG. 7. Alternatively, as described above, coil springs can be disposed for urging the centrifugal elements 31 to the outer peripheral side.

The inertia ring 30 has an inverted U shaped cross-section, and includes first and second ring parts 301 and 302 and a coupling part 303. The inertia ring 30 has a rotational axis, which is the same as that of the output-side rotor 12. The inertia ring 30 is rotatable with the output-side rotor 12, and is also rotatable relatively thereto.

Each of the first and second ring parts 301 and 302 has a continuous annular shape. The first and second ring parts 301 and 302 are disposed axially on both sides of the output-side rotor 12 such that a predetermined gap is produced between the output-side rotor 12 and each ring part 301, 302. In other words, the output-side rotor 12 and the first and second ring parts 301 and 302 are disposed in axial alignment. The outer diameter of each of the first and second ring parts 301 and 302 is set to be larger than that of the output-side rotor 12. Additionally, the inner diameter of the first ring part 301 and that of the second ring part 302 is set to be equal. The coupling part 303 couples the outer peripheral end of the first ring part 301 and that of the second ring part 302 on the outer peripheral side of the output-side rotor 12.

The centrifugal elements 31 are disposed in the output-side rotor 12, and are radially movable by centrifugal forces to be generated by rotation of the output-side rotor 12. Similarly to the first exemplary embodiment, the output-side rotor 12 herein includes the recesses 12a on the outer peripheral surface thereof. Additionally, the centrifugal elements 31 are inserted into the recesses 12a, respectively, and are radially movable therein. Similarly to the first exemplary embodiment, the centrifugal elements 31 and the recesses 12a are constructed such that a friction coefficient between the lateral surfaces of each centrifugal element 31 and each recess 12a is set to be less than or equal to 0.1. Moreover, each centrifugal element 31 is a plate-shaped member having approximately the same thickness as the output-side rotor 12.

As shown in FIGS. 7 and 8, each cam mechanism 32 is composed of a cam follower 35 and a pair of cams 36 provided on the inner peripheral end surfaces of the first and second ring parts 301 and 302. The cam follower 35 is fixed to the lower end of each centrifugal element 31. In more detail, the cam follower 35 includes a trunk 35a fitted to an axial through hole provided in each centrifugal element 31 and a pair of rollers 35b and 35c provided on both ends of the trunk 35a. It should be noted that the trunk 35a is preferably fitted to the through hole of each centrifugal element 31 in a rotatable state, but alternatively, can be fitted thereto in a non-rotatable state. Each pair of cams 36 is a pair of circular-arc surfaces with which each pair of rollers 35b and 35c makes contact. Each pair of rollers 35b and 35c is moved along each pair of cams 36 when the output-side rotor 12 and the inertia ring 30 are rotated relatively to each other in a predetermined angular range. Each pair of rollers 35b and 35c will be hereinafter referred to as "cam follower 35" on an as-needed basis.

[Actuation of Cam Mechanisms 32]

Regarding actuation of each cam mechanism 32 (inhibition of torque fluctuations), the basis thereof is similar to that in the first exemplary embodiment, although the layout of the cam follower 35 and the pair of cams 36 is different from that in the first exemplary embodiment. In other words, when torque fluctuations does not occur in transmitting a torque, as shown in the condition of FIG. 7, each cam follower 35 makes contact with the most outer peripheral side deeply recessed positions (circumferential middle positions) of each pair of cams 36, and the rotational phase difference between the output-side rotor 12 and the inertia ring 30 is "0".

On the other hand, when the rotational phase difference is produced between the output-side rotor 12 and the inertia ring 30 by torque fluctuations, each cam follower 35 is relatively moved along each pair of cams 36 in the right-and-left direction. At this time, as described above, a centrifugal force acts on each centrifugal element 31. Hence, each cam follower 35 attached to each centrifugal element 31 receives reaction forces from each pair of cams 36. The circumferential components of the reaction forces act on the output-side rotor 12 through each centrifugal element 31, whereby the rotational phase difference between the output-side rotor 12 and the inertia ring 30 is reduced.

As described above, when the rotational phase difference is produced between the output-side rotor 12 and the inertia ring 30 by torque fluctuations, the output-side rotor 12 receives forces directed to reduce the rotational phase difference between the output-side rotor 12 and the inertia ring 30 by the centrifugal force acting on each centrifugal element 31 and the working of each cam mechanism 32. Torque fluctuations are inhibited by the forces.

Similarly to the first exemplary embodiment, the aforementioned forces to inhibit torque fluctuations vary in accordance with the centrifugal force, in other words, the rotational speed of the output-side rotor 12, and also vary in accordance with the rotational phase difference and the shape of each cam 36. Therefore, by suitably setting the shape of each cam 36, characteristics of the torque fluctuation inhibiting device 140 can be made optimal in accordance with the specification of the engine and so forth.

Third Exemplary Embodiment

Figure 9:
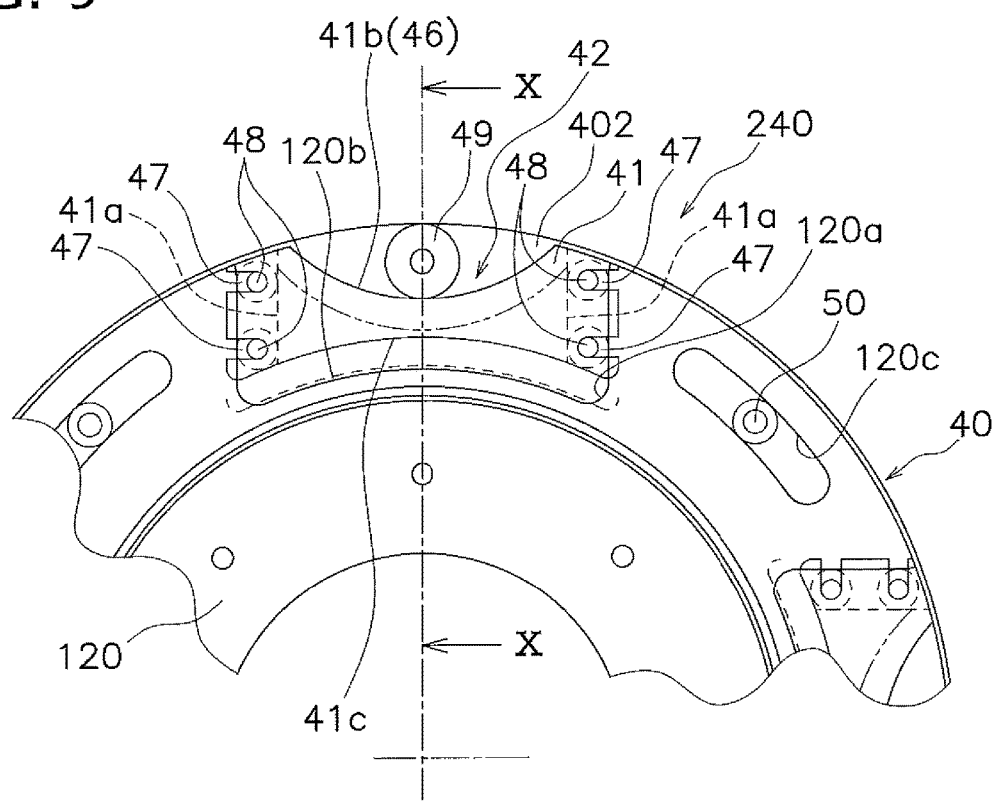
FIG. 9 is a partial front view of a torque fluctuation inhibiting device according to a third exemplary embodiment of the present disclosure.
Figure 10:
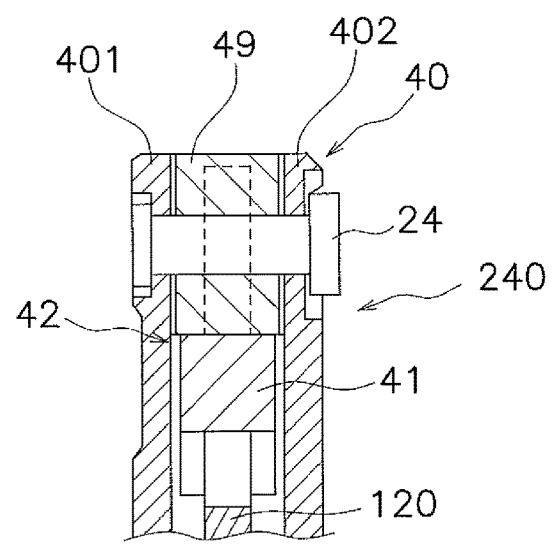
FIG. 10 is a cross-sectional view of FIG. 9 taken along line X-X.

FIG. 9 shows part of a torque fluctuation inhibiting device according to a third exemplary embodiment of the present disclosure, and corresponds to FIG. 3 in the first exemplary embodiment. Additionally, FIG. 10 is a cross-sectional view of FIG. 9 taken along line X-X. It should be noted that FIG. 9 shows a condition that one of inertia rings is detached from the torque fluctuation inhibiting device.

A torque fluctuation inhibiting device 240 according to the third exemplary embodiment is basically similar to, but different from, the torque fluctuation inhibiting device of the first exemplary embodiment mainly regarding specific shapes of the respective members and friction reducing rollers attached to both end surfaces of each centrifugal element.

As shown in FIGS. 9 and 10, an inertia ring 40 includes a first inertia ring 401 and a second inertia ring 402. Each of these inertia rings 401 and 402 is a continuous annular plate having a predetermined thickness. These inertia rings 401 and 402 are disposed axially on both sides of an output-side rotor 120 such that a predetermined gap is produced between the output-side rotor 120 and each inertia ring 401, 402. In other words, similarly to the aforementioned exemplary embodiments, the output-side rotor 120 and the first and second inertia rings 401 and 402 are disposed in axial alignment. The first and second inertia rings 401 and 402 have a common rotational axis, which is the same as the rotational axis of the output-side rotor 120. The first and second inertia rings 401 and 402 are rotatable with the output-side rotor 120, and are also rotatable relatively thereto.

Additionally, similarly to the first exemplary embodiment, the first and second inertia rings 401 and 402 are fixed by the rivets 24 penetrating the output-side rotor 120, and the first inertia ring 401 is axially, radially and rotation-directionally immovable with respect to the second inertia ring 402.

Similarly to the first exemplary embodiment, the output-side rotor 120 includes recesses 120a on the outer peripheral surface thereof. Each recess 120a herein includes a bottom surface 120b (inner peripheral side surface) made in the shape of a circular-arc about the rotational axis.

Figure 11:
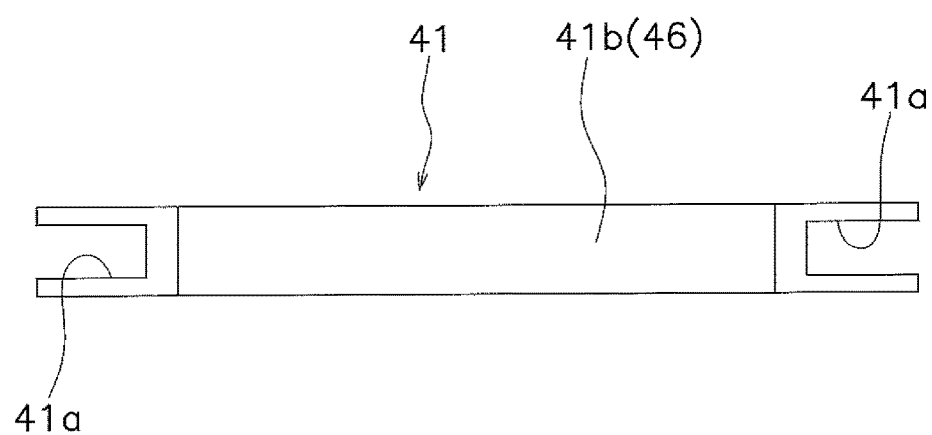
FIG. 11 is a plan view of a centrifugal element in the third exemplary embodiment.

Centrifugal elements 41 are disposed in the output-side rotor 120, and are radially movable by centrifugal forces to be generated by rotation of the output-side rotor 120. As shown in FIG. 11, each centrifugal element 41 includes grooves 41a on both circumferential ends thereof. It should be noted that FIG. 11 is a plan view of each centrifugal element 41 (a view seen from the outer peripheral side of the torque fluctuation inhibiting device). The width of each groove 41a is larger than that of the output-side rotor 120, and as is obvious from FIG. 9, the output-side rotor 120 is inserted into part of each groove 41a.

Each centrifugal element 41 is radially movable, while large part thereof is accommodated in each recess 120a. An outer peripheral surface 41b of each centrifugal element 41 is recessed in a circular-arc shape to the inner peripheral side, and functions as a cam 46. Additionally, similarly to the bottom surface 120b of each recess 120a, an inner peripheral side surface 41c of each centrifugal element 41 is made in the shape of a circular-arc about the rotational axis. Therefore, each centrifugal element 41 is configured to be radially movable in a wide range.

Two rollers 47 (friction reducing members) are disposed in each of the grooves 41a provided on both ends of each centrifugal element 41. Each of the rollers 47 is attached to and rotatable about each of pins 48 supported by both ends of each centrifugal element 41. The respective rollers 47 are capable of rolling along and in contact with the lateral surfaces of each recess 12a. With the configuration, the centrifugal elements 41 are smoothly movable in radially moving within each recess 12a.

Cam mechanisms 42 are similar to the cam mechanisms in the first exemplary embodiment, and each is composed of a cylindrical roller 49 functioning as a cam follower and the cam 46 provided as the outer peripheral surface 41b of each centrifugal element 41. Additionally, the action of each cam mechanism 42 is also similar to that of each cam mechanism in the first exemplary embodiment. When torque fluctuations occur, rotational phase difference is produced between the output-side rotor 120 and the first and second inertia rings 401 and 402, and torque fluctuations are inhibited by the working of each cam mechanism 42.

It should be noted that in the third exemplary embodiment, the output-side rotor 120 includes circumferentially elongated holes 120c, each of which is located circumferentially between adjacent two of the recesses 120a. Additionally, stop pins 50 are provided for coupling the first inertia ring 401 and the second inertia ring 402, and penetrate the elongated holes 120c, respectively. With the configuration, a stopper mechanism is formed and restricts relative rotation between the output-side rotor 120 and the first and second inertia rings 401 and 402 to a predetermined angular range.

Other Exemplary Embodiments

The present disclosure is not limited to the exemplary embodiments described above, and a variety of changes or modifications can be made without departing from the scope of the present disclosure.

(a) In the aforementioned respective exemplary embodiments, the inertia rings are disposed axially on both sides of the output-side rotor. Contrarily, output-side rotors can be disposed axially on both sides of an inertia ring. Alternatively, an inertia ring can be disposed on only one side of the output-side rotor.

(b) In the aforementioned exemplary embodiments, the inertia ring is composed of a continuous annular member. However, a plurality of inertia bodies divided from each other can be disposed in circumferential alignment. In this case, for the purpose of holding the plural inertia bodies, a holding member such as a holding ring having an annular shape is required to be provided on the outer peripheral side of the inertia bodies.

Figure 12:
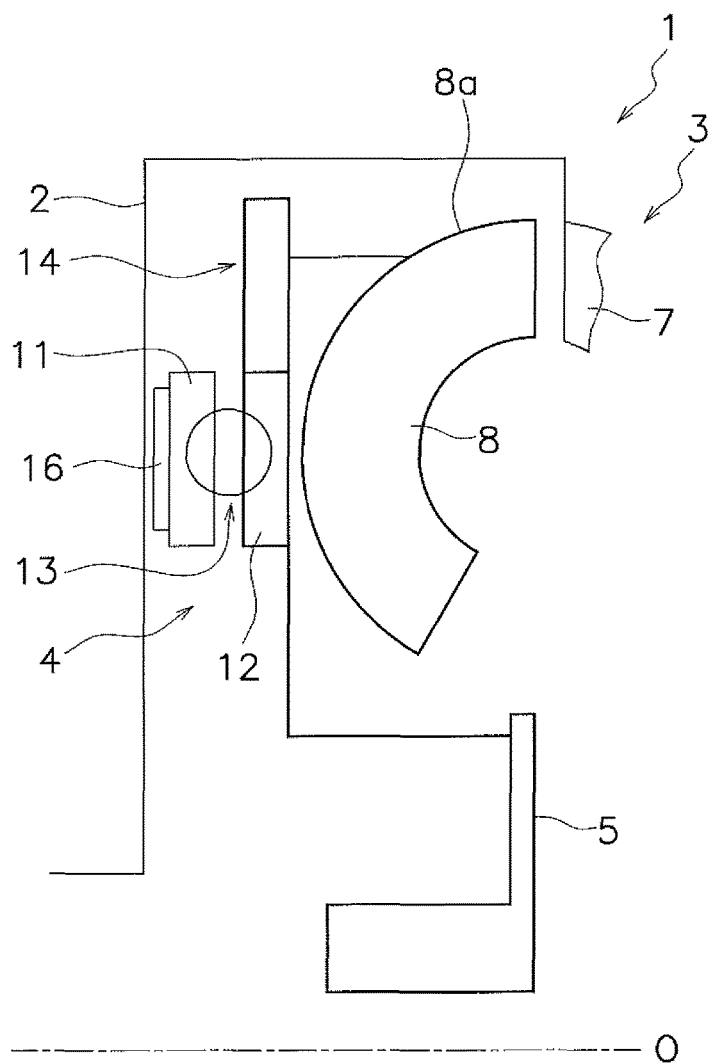
FIG. 12 is a diagram showing yet another exemplary embodiment of the present disclosure and corresponds to FIG. 1.

(c) As shown in FIG. 12, an inertia ring, composing the torque fluctuation inhibiting device 14, can be configured to be coupled to the turbine 8. In this case, the turbine 8 is not coupled to the output hub 5. The inertia ring is herein coupled to the turbine 8 (exactly speaking, a turbine shell 8a), and hence, the turbine shell 8a also functions as an inertia element (an inertia body) together with the inertia ring.

It should be noted that in an exemplary embodiment shown in FIG. 12, when the lock-up off state is made, a torque from the torque converter body 3 is transmitted from the torque fluctuation inhibiting device 14 to the output-side rotor 12 through the turbine 8, and is then outputted to the output hub 5. At this time, it is difficult to transmit a torque (not torque fluctuations but steady average torque) from the inertia ring to the output-side rotor 12 through the cam mechanisms. Therefore, it is required to reliably produce an angular range in which each of the cam mechanisms is actuated, and besides, it is required to produce a configuration to transmit a torque with springs, mechanical stoppers or so forth.

(d) In the third exemplary embodiment, the rollers are disposed as friction reducing members between each centrifugal element and each recess. Alternatively, another member for reducing friction (a resin race, a sheet, etc.) can be disposed therebetween.

Application Examples

The torque fluctuation inhibiting device described above can be disposed in a variety of settings when applied to a torque converter or other types of power transmission device. Specific application examples will be hereinafter explained with use of schematic diagrams of the torque converter and the other types of power transmission device.

Figure 13:
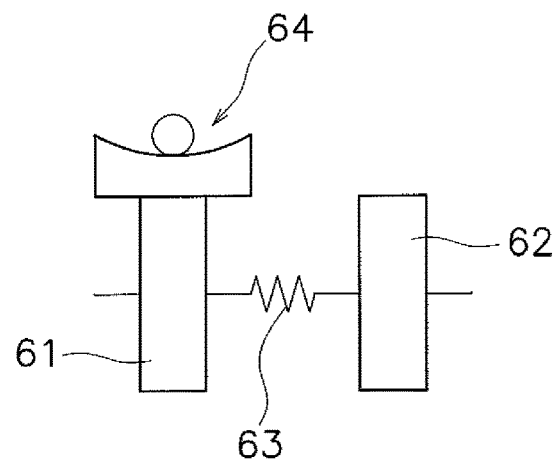
FIG. 13 is a schematic diagram showing application example 1 of the present disclosure.

(1) FIG. 13 is a diagram schematically showing a torque converter. The torque converter includes an input-side rotor 61, an output-side rotor 62 and a damper 73 disposed between both rotors 61 and 62. The input-side rotor 61 includes members such as a front cover, a drive plate and a piston. The output-side rotor 62 includes a driven plate and a turbine hub. The damper 63 includes a plurality of torsion springs.

In the example shown in FIG. 13, a centrifugal element is provided on any of the rotary members composing the input-side rotor 61, and a cam mechanism 64 is provided to be actuated with use of a centrifugal force acting on the centrifugal element. A configuration applicable to the cam mechanism 64 is similar to that in the aforementioned respective exemplary embodiments.

Figure 14:
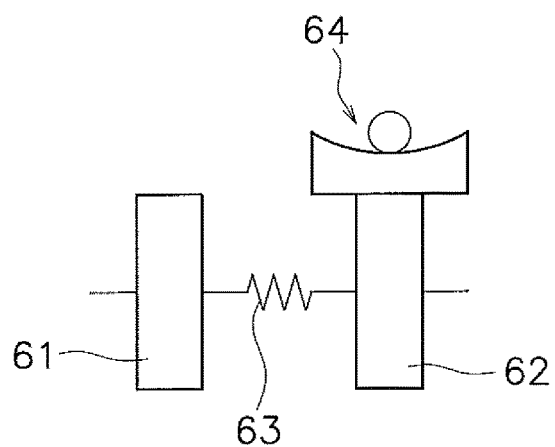
FIG. 14 is a schematic diagram showing application example 2 of the present disclosure.

(2) In a torque converter shown in FIG. 14, a centrifugal element is provided on any of the rotary members composing the output-side rotor 62, and the cam mechanism 64 is provided to be actuated with use of a centrifugal force acting on the centrifugal element. A configuration applicable to the cam mechanism 64 is similar to that in the aforementioned respective exemplary embodiments.

Figure 15:
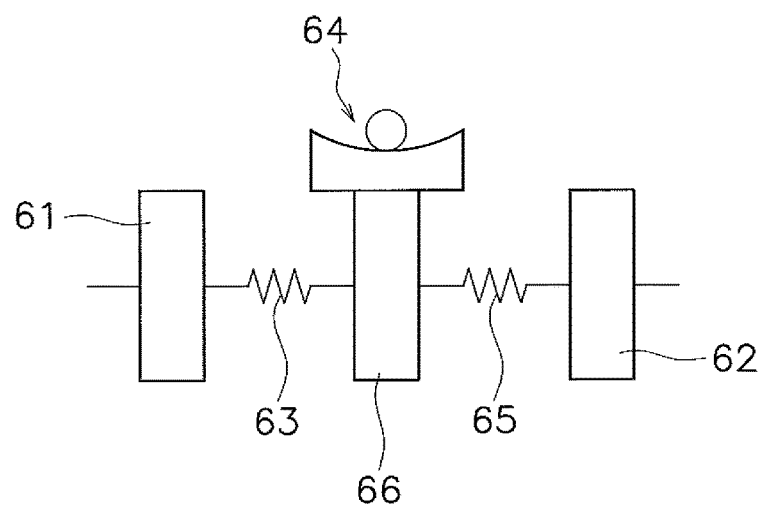
FIG. 15 is a schematic diagram showing application example 3 of the present disclosure.

(3) A torque converter shown in FIG. 15 includes another damper 65 and an intermediate member 66 provided between the two dampers 63 and 65 in addition to the configurations shown in FIGS. 13 and 14. The intermediate member 66 is rotatable relatively to the input-side rotor 61 and the output-side rotor 62, and makes the two dampers 63 and 65 act in series.

In the example shown in FIG. 15, a centrifugal element is provided on the intermediate member 66, and the cam mechanism 64 is provided to be actuated with use of a centrifugal force acting on the centrifugal element. A configuration applicable to the cam mechanism 64 is similar to that in the aforementioned respective exemplary embodiments.

Figure 16:
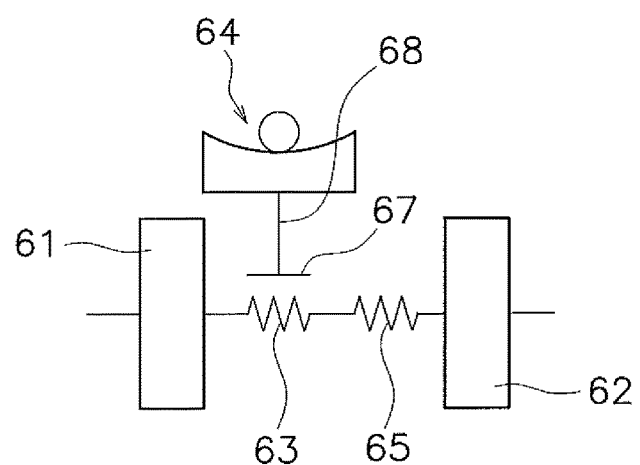
FIG. 16 is a schematic diagram showing application example 4 of the present disclosure.

(4) A torque converter shown in FIG. 16 includes a float member 67. The float member 67 is a member for supporting at least one torsion spring composing the damper 63. For example, the float member 67 has an annular shape and is disposed to cover the at least one torsion spring from the outer peripheral side and at least one lateral side. Additionally, the float member 67 is rotatable relatively to the input-side rotor 61 and the output-side rotor 62, and is rotated together with the damper 63 by friction with the at least one torsion spring of the damper 63. In other words, the float member 67 is also rotated.

In the example shown in FIG. 16, a centrifugal element 68 is provided on the float member 67, and the cam mechanism 64 is provided to be actuated with use of a centrifugal force acting on the centrifugal element 68. A configuration applicable to the cam mechanism 64 is similar to that in the aforementioned respective exemplary embodiments.

Figure 17:
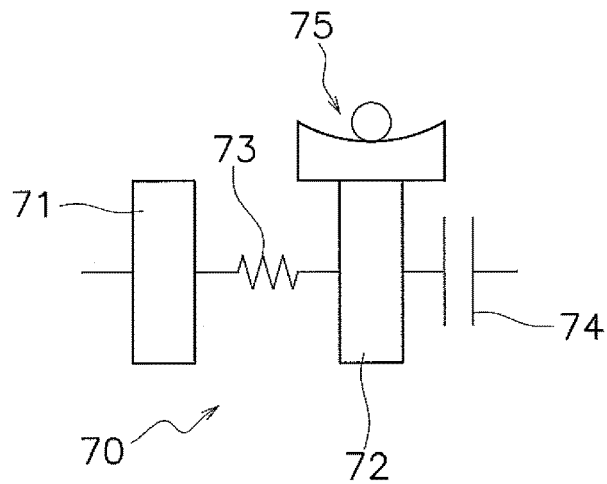
FIG. 17 is a schematic diagram showing application example 5 of the present disclosure.

(5) FIG. 17 is a schematic diagram of a power transmission device that includes a flywheel 70, composed of two inertia bodies 71 and 72, and a clutch device 74. In other words, the flywheel 70, disposed between the engine and the clutch device 74, includes the first inertia body 71, the second inertia body 72 and a damper 73. The second inertia body 72 is disposed to be rotatable relatively to the first inertia body 71. The damper 73 is disposed between the two inertia bodies 71 and 72. It should be noted that the second inertia body 72 includes a clutch cover composing the clutch device 74 as one of the constituent members thereof.

In the example shown in FIG. 17, a centrifugal element is provided on any of the rotary members composing the second inertia body 72, and a cam mechanism 75 is provided to be actuated with use of a centrifugal force acting on the centrifugal element. A configuration applicable to the cam mechanism 75 is similar to that in the aforementioned respective exemplary embodiments.

Figure 18:
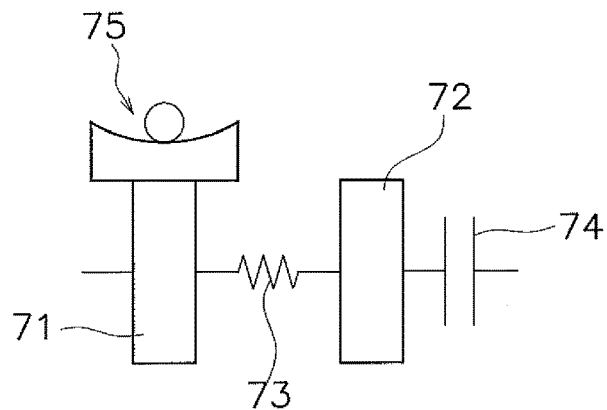
FIG. 18 is a schematic diagram showing application example 6 of the present disclosure.

(6) FIG. 18 shows an example of a power transmission device similar to that in FIG. 17. In this example, a centrifugal element is provided on the first inertia body 71. Additionally, the cam mechanism 75 is provided to be actuated with use of a centrifugal force acting on the centrifugal element. A configuration applicable to the cam mechanism 75 is similar to that in the aforementioned respective exemplary embodiments.

Figure 19:
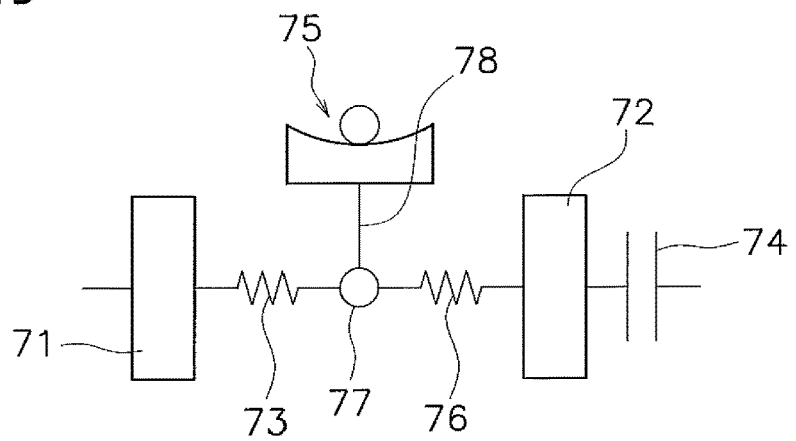
FIG. 19 is a schematic diagram showing application example 7 of the present disclosure.

(7) A power transmission device shown in FIG. 19 includes another damper 76 and an intermediate member 77 provided between the two dampers 73 and 76 in addition to the configurations shown in FIGS. 17 and 18. The intermediate member 77 is rotatable relatively to the first inertia body 71 and the second inertia body 72.

In the example shown in FIG. 19, a centrifugal element 78 is provided on the intermediate member 77, and the cam mechanism 75 is provided to be actuated with use of a centrifugal force acting on the centrifugal element 78. A configuration applicable to the cam mechanism 75 is similar to that in the aforementioned respective exemplary embodiments.

Figure 20:
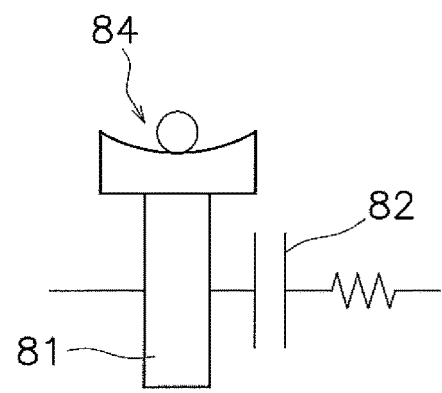
FIG. 20 is a schematic diagram showing application example 8 of the present disclosure.

(8) FIG. 20 is a schematic diagram of a power transmission device that a clutch device is provided on one flywheel. In FIG. 20, a first inertia body 81 includes one flywheel and a clutch cover of a clutch device 82. In this example, a centrifugal element is provided on any of the rotary members composing the first inertia body 81, and a cam mechanism 84 is provided to be actuated with use of a centrifugal force acting on the centrifugal element. A configuration applicable to the cam mechanism 84 is similar to that in the aforementioned respective exemplary embodiments.

Figure 21:
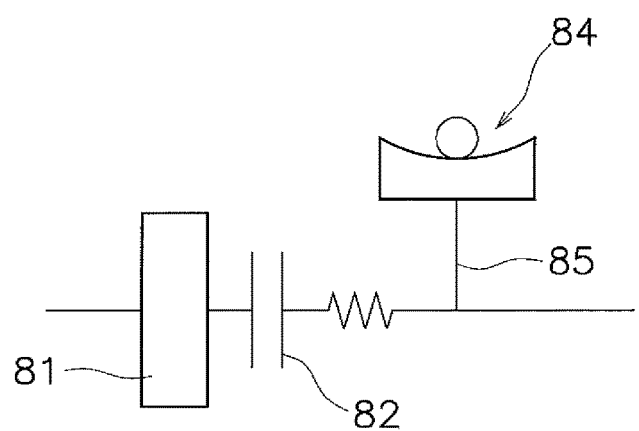
FIG. 21 is a schematic diagram showing application example 9 of the present disclosure.

(9) FIG. 21 shows an example of a power transmission device similar to that in FIG. 20. In this example, a centrifugal element is provided on an output side of the clutch device 82. Additionally, the cam mechanism 84 is provided to be actuated with use of a centrifugal force acting on the centrifugal element 85. A configuration applicable to the cam mechanism 84 is similar to that in the aforementioned respective exemplary embodiments.

(10) The torque fluctuation inhibiting device according to the present disclosure can be disposed on any of the rotary members composing the transmission, and furthermore, can be disposed on an output-side shaft (a propeller shaft or a drive shaft) of the transmission, although these configurations are not shown in the drawings.

(11) As another application example, the torque fluctuation inhibiting device of the present disclosure can be further applied to a heretofore well-known dynamic damper device or a power transmission device provided with a pendulum-type damper device.

According to the present disclosure, in a device for inhibiting torque fluctuations in a rotary member, a peak of torque fluctuations can be reduced in a relatively wide rotational speed range.

REFERENCE SIGNS LIST

1 Torque converter
11, 61 Input-side rotor
12, 62 Output-side rotor
14, 140, 240 Torque fluctuation inhibiting device
30, 40 Inertia ring (mass body)
21, 31, 41, 68, 78, 85 Centrifugal element
22, 32, 42, 64, 75, 84 Cam mechanism
23 Coil spring (urging member)
25, 35, 49 Roller (cam follower)
26, 36, 46 Cam
63, 65, 73, 76 Damper
66, 77 Intermediate member
67 Float member
70 Flywheel
71, 72, 81 Inertia body
74, 82 Clutch device
301, 302 Ring part
303 Coupling part

The invention claimed is:

1. A torque fluctuation inhibiting device for inhibiting torque fluctuations in a rotor to which a torque is inputted, the torque fluctuation inhibiting device comprising:
a mass body disposed in alignment with the rotor in an axial direction, the mass body disposed to be rotatable with the rotor and be rotatable relative to the rotor, the mass body including a first inertia ring and a second inertia ring, the first and second inertia rings disposed in opposition to each other with the rotor interposed therebetween;
a centrifugal element disposed to receive a centrifugal force to be generated by rotation of the rotor and the mass body; and
a cam mechanism including a cam and a cam follower, the cam mechanism for converting the centrifugal force that acts on the centrifugal element into a circumferential force when a relative displacement is produced between the rotor and the mass body in a rotational direction, the circumferential force directed to reduce the relative displacement, the cam provided on the centrifugal element or one of the rotor and the mass body, the cam follower provided on the one of the rotor and the mass body or the centrifugal element.

2. The torque fluctuation inhibiting device according to claim 1, wherein
the mass body further includes a pin, the pin coupling the first and second inertia rings while penetrating the rotor in the axial direction so as to make the first and second inertia rings non-rotatable relatively to each other,
the centrifugal element is disposed on an outer peripheral part of the rotor and on an inner peripheral side of the pin while disposed between the first inertia ring and the second inertia ring in the axial direction,
the cam follower is a cylindrical roller including a hole in an inner part thereof, the hole penetrated by the pin in the axial direction, and
the cam is provided on the centrifugal element, the cam for making contact with the cam follower, the cam having a shape for making the circumferential force vary in accordance with an amount of the relative displacement between the rotor and the mass body in the rotational direction.

3. The torque fluctuation inhibiting device according to claim 1, wherein
the mass body further includes a coupling part for coupling an outer peripheral end of the first inertia ring and an outer peripheral end of the second inertia ring, the first and second inertia rings have an equal inner diameter,
the centrifugal element is disposed on an outer peripheral part of the rotor while disposed between the first inertia ring and the second inertia ring in the axial direction,
the cam follower is provided on the centrifugal element, and
the cam is provided on inner peripheral end surfaces of the first and second inertia rings, the cam for enabling the cam follower to make contact therewith, the cam having a shape for making the circumferential force vary in accordance with an amount of the relative displacement between the rotor and the mass body in the rotational direction.

4. The torque fluctuation inhibiting device according to claim 1, wherein
the rotor includes a recess on an outer peripheral surface thereof, and
the centrifugal element is accommodated in the recess.

5. The torque fluctuation inhibiting device according to claim 4, wherein
the centrifugal element is movable inside the recess in a radial direction, and
a friction coefficient between the centrifugal element and the recess is less than or equal to 0.1.

6. The torque fluctuation inhibiting device according to claim 5, wherein a friction reducing member is disposed between a lateral surface of the centrifugal element and the recess so as to reduce friction that occurs in movement of the centrifugal element, the lateral surface disposed along a moving direction of the centrifugal element.

7. The torque fluctuation inhibiting device according to claim 6, wherein the friction reducing member is made in form of a plurality of rollers, the plurality of rollers rotatably supported by both circumferential ends of the centrifugal element, the plurality of rollers for rolling between both circumferential end surfaces of the centrifugal element and lateral surfaces of the recess.

8. The torque fluctuation inhibiting device according to claim 5, further comprising:
an urging member disposed inside the recess, the urging member for urging the centrifugal element outward in the radial direction such that the cam and the cam follower make contact with each other while the rotor and the mass body are not being rotated.

9. The torque fluctuation inhibiting device according to claim 1, wherein the mass body has a continuous annular shape.

10. A torque converter disposed between an engine and a transmission, the torque converter comprising:
an input-side rotor to which the torque is inputted from the engine;
an output-side rotor for outputting the torque to the transmission;
a damper disposed between the input-side rotor and the output-side rotor; and
the torque fluctuation inhibiting device recited in claim 1.

11. The torque converter according to claim 10, wherein the torque fluctuation inhibiting device is disposed on the input-side rotor.

12. The torque converter according to claim 10, wherein the torque fluctuation inhibiting device is disposed on the output-side rotor.

13. The torque converter according to claim 10, wherein the damper includes
a first damper to which the torque is inputted from the input-side rotor,
a second damper for outputting the torque to the output-side rotor, and
an intermediate member provided between the first damper and the second damper, and
the torque fluctuation inhibiting device is disposed on the intermediate member.

14. The torque converter according to claim 10, wherein the damper includes a plurality of coil springs,
the torque converter further comprises a float member, the float member rotatable relatively to the input-side rotor and the output-side rotor, the float member for supporting the plurality of coil springs, and
the torque fluctuation inhibiting device is disposed on the float member.

15. A power transmission device comprising:
a flywheel including a first inertia body, a second inertia body and a damper, the first inertia body to be rotated about a rotational axis, the second inertia body to be rotated about the rotational axis, the second inertia body rotatable relatively to the first inertia body, the damper disposed between the first inertia body and the second inertia body;
a clutch device provided on the second inertia body of the flywheel; and
the torque fluctuation inhibiting device recited in claim 1.

16. The power transmission device according to claim 15, wherein the torque fluctuation inhibiting device is disposed on the second inertia body.

17. The power transmission device according to claim 15, wherein the torque fluctuation inhibiting device is disposed on the first inertia body.

18. The power transmission device according to claim 15, wherein
the damper includes
a first damper to which the torque is inputted from the first inertia body,
a second damper for outputting the torque to the second inertia body, and
an intermediate member provided between the first damper and the second damper, and
the torque fluctuation inhibiting device is disposed on the intermediate member.

* * * * *